United States Patent
Vilou et al.

(10) Patent No.: US 7,302,870 B2
(45) Date of Patent: Dec. 4, 2007

(54) MOTOR VEHICLE STARTER WITH IMPROVED STARTER DRIVE ASSEMBLY

(75) Inventors: Gérard Vilou, Tassin la Demi Lune (FR); Guy Faucon, Lyons (FR); Christian Mornieux, Oullins (FR); Chantal Bocquet, Lyons (FR); Gilles Vadin-Michaud, Villeurbanne (FR)

(73) Assignee: Valeo Equipements Electriques Moteur, Creteil (FR)

( * ) Notice: Subject to any disclaimer, the term of this patent is extended or adjusted under 35 U.S.C. 154(b) by 637 days.

(21) Appl. No.: 10/343,930

(22) PCT Filed: Jun. 28, 2002

(86) PCT No.: PCT/FR02/02244

§ 371 (c)(1),
(2), (4) Date: Feb. 6, 2003

(87) PCT Pub. No.: WO03/002871

PCT Pub. Date: Jan. 9, 2003

(65) Prior Publication Data

US 2003/0131817 A1    Jul. 17, 2003

(30) Foreign Application Priority Data

Jun. 29, 2001  (FR)  .................... 01 08610

(51) Int. Cl.
*F02N 15/02*  (2006.01)
*F02N 15/06*  (2006.01)
*F02N 17/00*  (2006.01)

(52) U.S. Cl. ..................... 74/7 C; 192/66.22

(58) Field of Classification Search ............ 74/6, 74/7 A, 7 B, 7 C, 7 D, 7 R, 8; 192/66.22, 192/89.2; 403/293; 267/36.1, 47, 53, 229
See application file for complete search history.

(56) References Cited

U.S. PATENT DOCUMENTS

| 1,228,411 | A | * | 6/1917 | Conner ................. 192/52.6 |
| 3,646,820 | A | * | 3/1972 | Vogel et al. ................ 74/6 |
| 4,193,434 | A |   | 3/1980 | Wagner |

(Continued)

FOREIGN PATENT DOCUMENTS

DE           242194       *    2/1911

(Continued)

*Primary Examiner*—Richard Ridley
*Assistant Examiner*—James Pilkington
(74) *Attorney, Agent, or Firm*—Berenato, White & Stavish

(57) ABSTRACT

Motor vehicle starter comprising a starter head provided with a pinion (1), a driver (2) and a coupling device with a conical clutch for coupling the pinion to the driver (2), in which the conical clutch comprises a first frustoconical friction surface (8) fixed to the pinion and a second frustoconical friction surface (8') with a shape complementary to the first surface (8) and fixed to the driver and in which the coupling device comprises on the one hand a hollow-shaped coupling piece having a bottom extended by an annular skirt directed axially towards one of the elements consisting of pinion and driver and on the other hand axially acting elastic means (10) bearing on a first stop fixed to the coupling piece for acting on a second stop fixed to one of the elements consisting of pinion and driver. The elastic means comprise axially deformable tongues (10b) and extend circumferentially.

28 Claims, 4 Drawing Sheets

U.S. PATENT DOCUMENTS

| | | | | |
|---|---|---|---|---|
| 4,843,897 A | * | 7/1989 | Tallis, Jr. | 74/6 |
| 4,902,905 A | * | 2/1990 | Morishita | 290/48 |
| 5,050,411 A | * | 9/1991 | Kawachi et al. | 70/248 |
| 5,050,441 A | * | 9/1991 | Giometti | 74/7 C |
| 5,857,380 A | * | 1/1999 | Kajino et al. | 74/7 E |
| 6,237,432 B1 | * | 5/2001 | Vilou | 74/7 C |
| 2004/0129096 A1 | * | 7/2004 | Vilou et al. | 74/7 C |

FOREIGN PATENT DOCUMENTS

| | | | |
|---|---|---|---|
| FR | 2772433 | * | 6/1999 |

* cited by examiner

MOTOR VEHICLE STARTER WITH IMPROVED STARTER DRIVE ASSEMBLY

TECHNICAL FIELD OF THE INVENTION

The present invention relates to motor vehicle starters and more precisely to the starter heads which such starters have.

PRIOR ART

As illustrated in FIG. 1, a motor vehicle starter conventionally comprises a contactor 12 and an electric motor M adapted to drive, directly or indirectly, here via a reduction gear, an output shaft 100, which carries a starter head provided with a pinion 1. The pinion 1 is intended to cooperate with the gearing on the starting ring C of the internal combustion engine of the motor vehicle. It slides on the output shaft between an idle position in which it is disengaged with respect to the said starting ring and a forward position in which it meshes with the latter whilst being in abutment on a working stop 6.

The contactor 12 extends parallel to the electric motor M above the latter and comprises a winding 12a and a solenoid plunger 12b.

It controls the supply to the electric motor M by moving a movable contact 13 between an open position and a closed position, the said contact 13 being pushed by the said solenoid plunger 12b able to move axially with respect to the electric motor M when the winding 12a is activated.

The contactor 12 also controls the movement of the pinion 1. Its solenoid plunger 12b is for this purpose connected to the pinion 1 by mechanical means referenced 14 overall.

These mechanical means comprise a control lever in the form of a fork coupled at its top end to the solenoid plunger 12b and at its bottom end to a driver also belonging to the starter head. The driver is provided with a drive socket comprising a groove for receiving the fork. The fork accompanies the starter head to the advanced working position of the pinion.

The starter head also comprises a free wheel interposed axially between the drive socket and the pinion 1. The drive socket is provided on the inside with helical flutes in engagement in a complementary manner with external helical teeth carried locally by the output shaft driven by the electric motor M when the latter is supplied electrically.

The fork is mounted pivotally between its two ends on a casing containing on the inside the mechanical means 14 and carrying the motor M and the contactor 12. The starter head with its pinion 1 is driven in a helical movement when it is moved by the fork in order to come into engagement with the starting ring.

This is achieved by supplying the winding 12a following an actuation of the ignition key, which moves the solenoid plunger 12b then attracted in the direction of a fixed core mounted at the end of a support for the winding 12a. This support has a U-shaped cross-section for housing the winding 12a and therefore comprises a bottom constituting a bearing 12c. The plunger 12b is therefore intended to move between an idle position and a contacting position on which it is in abutment on the fixed core; this position of closure of the magnetic circuit taking place after closure of the moving contact 13 and therefore of the electrical circuit.

The mechanical means also comprise a return spring mounted around the plunger 12b in order to return the latter into the idle position, a cutoff spring associated with the movable contact 13 in order to return the latter into the open position and a spring 15, known as a tooth-against-tooth spring, housed inside the plunger 12b and in engagement with a first rod connected by a spindle to the top end of the fork for coupling the latter to the plunger 12b. This spring 15 has greater stiffness than the return spring.

The fork is therefore interposed at its top end between the plunger 12b and the spindle. The first rod is mounted inside a blind hole in the plunger 12b. The plunger 12b is intended, after a given travel, to come into engagement with a second rod fixed to the moving contact 13 and mounted so as to slide inside the fixed core. In the closed position the contact 13 cooperates with a fixed contact, in the form of studs connected respectively to the positive terminal of the battery and to the electric motor M, thus enabling the electric motor to be supplied.

The studs are fixed to the contactor closure cap made from insulating material.

All these elements are shown in FIG. 1 and have not all been referenced for reasons of simplicity.

The pinion 1 can therefore come into engagement with the ring C, that is to say come into the position of meshing with the ring C, before the moving contact is closed.

Usually the pinion 1 comes axially into abutment contact with teeth on the ring C before entering the latter.

Thus the mechanical means 14 comprise in particular the spring 15, which is mechanically interposed between the solenoid plunger 12b and the pinion 1 and which enables the solenoid plunger 12b to continue its travel in order, before its contact with the fixed core, to put the moving contact in the closed position, even if the pinion 1 is locked in abutment against the teeth on the ring of the thermal engine in a position in which it is not meshing with this ring.

As is known, the free wheel, interposed between the pinion 1 and the socket of the starter head, has the main function of, when the internal combustion engine of the vehicle starts, preventing the pinion 1 from driving the electric motor at an excessively high speed liable to damage the latter.

The rollers which the free wheel have are each subjected to the action of a circumferentially acting spring so that this damps the abrupt vibrations of the torque transmitted between the driving socket and the pinion 1.

For the purpose of reducing the bulk, weight and cost of the free wheel compared with its usage, it was proposed in the document FR-A-2 772 433 to involve a coupling device with a clutch of the conical type between the pinion and the driver in order to couple the pinion to the starter head.

In practice, the pinion and the driver each carry for fixing respectively a first frustoconical friction surface and a second frustoconical friction surface. These coaxial friction surfaces have complementary shapes, one of the frustoconical friction surfaces entering inside the other frustoconical friction surface, referred to as the external surface. These surfaces are forced in contact with each other, with a force with a predetermined value, by means of axially-acting elastic means bearing in a first embodiment (FIGS. 3 and 4) on a first stop fixed to the free end of a skirt belonging to one piece, referred for convenience as the coupling piece, annular in shape for acting on a second stop fixed to the driver so that the driver can slide in rotation with respect to the pinion of the starter head when the speed of rotation of the pinion is greater than that of the driver. In a variant in a second embodiment (FIGS. 2 and 5), the elastic means bear on a first stop fixed to the coupling piece crimped to a ferrule belonging to the driver for acting on a second stop fixed to the pinion.

The mean diameter of the friction surfaces is substantially equal to the diameter of the pitch circle of the teeth of the starter head pinion. In practice the coupling piece consists of a starter head cap having at its external periphery an annular skirt directed axially towards the driver whilst being cylindrical in shape and axially oriented. This cap has a bottom which, in the first embodiment, is axial abutment on a protrusion on an axial extension of the pinion. In the second embodiment the axially-acting elastic means are interposed between the bottom of the coupling piece and the axial extension of the pinion.

The elastic means consist in one embodiment of a coiled spring and in another embodiment of a corrugated ring.

These provisions give satisfaction, but nevertheless it may be desirable, in a simple and economical fashion, to increase still further the effectiveness and reliability in operation of the coupling device with conical clutch.

The object of the present invention is to meet this requirement.

OBJECT OF THE INVENTION

According to the invention a starter of the above-mentioned type is characterised in that the elastic means comprise tongues which are elastically deformable axially and in that the tongues extend circumferentially and axially in the same direction.

By virtue of the invention, the force exerted by the elastic means is better controlled so that the effectiveness and reliability of the coupling device are increased since the elastic tongues generate a more constant force as a function of a wearing travel than that generated by an elastic ring of the corrugated type.

This is because, with a corrugated ring, the axial force varies rapidly according to the wearing travel so that the force generated by this type of ring is great at the start of the service life of the starter head and then decreases subsequently. More precisely the elastic means are mounted under prestressing so as to create, at the frustoconical friction surfaces of the conical clutch, a friction torque greater than the screwing torque of the driver on the flutes of the output shaft of the starter so that it will be sought to have a minimum force at the end of wear on the starter which provides this condition. With a corrugated ring the force must therefore be great at the start of the life of the starter head in order to achieve this condition at the end of wear. This high force is a nuisance when the motor vehicle engine starts and drives the electric motor of the starter since a high residual torque is transmitted from the pinion to this electric motor. A high value of this residual torque presents a risk of damage to the electric motor of the starter by overspeeding.

With this type of corrugated ring a risk is taken from the point of view of reliability of the starter and from the point of view of the noise generated by the overspeeding of the electric motor of the starter.

By virtue of the tongues according to the invention this drawback is not found since the variations in the forces exerted by these tongues on the conical clutch at the start and end of the life of the starter are less great.

This solution according to the invention increases the service life and reliability of the starter, whilst making it less noisy in overspeed.

With a helical spring it is possible to obtain less great variations in force provided that the axial length of it is increased, which results in increasing the axial length of the starter head.

By virtue of the tongues according to the invention a solution is obtained which is axially compact.

The elastic tongues have a reduced axial bulk and are curved in one embodiment axially so that, after assembly, the bending forces bring the friction surfaces in contact with each other.

By acting on the circumferential length and on the thickness of the tongues, the load exerted by the latter is controlled. The tongues belong to an elastic area of the axially acting elastic means.

This elastic area is connected to an area for stopping the starter head or pinion in translation, coupled to the skirt of the coupling piece. This stop area is in contact with the stop concerned and is offset axially with respect to the free end of the tongues.

In one embodiment it is in the form of an annular cap fixed for example by crimping or clipping to the skirt having for this purpose a protuberance or a groove. In a variant the stop area is reduced to a simple ring.

This ring is, in one embodiment, open for example radially so that it behaves like a circlip mounted in a groove in the skirt.

The flank of the groove furthest away from the second stop constitutes the first stop.

This solution is simple and economical since firstly the groove is easy to produce, for example by turning, and secondly the number of parts to be assembled in the end is at a minimum; the elastic means finally lock the assembly of the pinion with the driver each constituting a sub-assembly.

In a variant the first stop belongs to a piece projecting radially towards the inside and attached for example by welding, adhesive bonding or crimping to the free end of the skirt.

In a variant the ring is closed and a mounting of the bayonet type acts for mounting it on the skirt.

For example, the ring has at its external periphery projecting radial lugs engaging in passages opening out on the one hand at the free end of the skirt and on the other hand in the groove.

The lugs are engaged in the passage and then a rotation of the lugs in the groove is next effected.

In a variant, when the first stop extends in radial projection towards the inside, it is divided into annular sectors in order to produce passages, the ring then having at its external periphery scallops for the annular sectors to pass and allowing a rotation of the ring in order to bring the external periphery thereof, in the form of lugs, in contact with the first stop; these sectors advantageously comprise hollows for receiving the lugs and locking the ring with respect to rotation.

Naturally, in a variant, the elastic means are first put in place and then the first stop is next attached.

In one embodiment the tongues are cut circumferentially in the ring.

In a variant the elastic area is surrounded by the ring and is connected to the internal periphery thereof by locating areas.

The tongues are then produced in the form of arms in the shape of an annular sector, which makes it possible to obtain a great circumferential length whilst having an advantageous elastic characteristic.

More precisely, according to the circumferential length of the arm and its cross-section, the required force is obtained according to the axial deflection of the arm.

In one embodiment the circumferentially-oriented arms extend circumferentially in cantilever on each side of a locating area.

The internal periphery of the ring belonging to the stop area has a greater diameter than the diameter of the external periphery of the arms.

The elastic area is then located below the internal periphery of the stop area.

The elastic means according to the invention can for example be integrated into the cap in FIG. 5 of the aforementioned document FR A 2 772 433. Nevertheless it may be desirable to make the starter head more robust and to simplify it still further, whilst increasing further the reliability and performance of the starter head.

Thus preferably the elastic means are carried by the skirt of the coupling piece, which internally carries one of the frustoconical friction surfaces. This skirt is, via the bottom of the coupling piece, integral with the pinion/starter head element which is associated with the friction surface carried internally by the skirt, so that the mean diameter of contact of the first frustoconical friction surface with the second frustoconical friction surface is greater than the diameter of the pitch circle of the teeth of the pinion.

Advantageously the said mean diameter is greater than the diameter of the tip circle of the teeth on the pinion.

This mean diameter is, in the event of overspeeding of the pinion with respect to the driver, a mean friction diameter. The conical clutch according to the invention is in a reliable manner locked when the electric motor of the starter drives the internal combustion engine of the vehicle via the starting ring and is adapted to be released when the internal combustion engine drives the pinion at a higher rotation speed (overspeeding) than that of the driver.

By virtue of these provisions the efficacy and reliability of the starter head are increased since the mean diameter of the first or second frustoconical friction surface is greater because this surface-belongs to the skirt of the coupling piece located on a larger diameter than the diameter of the tip circle of the pinion. In this way the mean diameter of the first frustoconical friction surface is increased with respect to the diameter of the flutes on the output shaft of the starter carrying the driver. Naturally the mean diameter of the second frustoconical friction surface is also increased because the two frustoconical friction surfaces are coaxial and complementary, the second surface entering inside the first surface. These two frustoconical surfaces have the same cone angle.

Thus, by virtue of the invention, for a given diametral size of the starter head, the first frustoconical friction surface and the second frustoconical friction surface will therefore each have the largest possible mean friction diameter.

It will also be appreciated that the ferrules in FIGS. 3 and 5 in the document FR A 2 772 433 are omitted so that the starter head is simplified and is more robust. The pinion is also simplified.

In general terms the integration of the coupling piece in the pinion or driver makes it possible to reduce the number of parts to be assembled in the end, the elastic means locking the whole.

Advantageously one of the frustoconical friction surfaces is longer axially than the other frustoconical friction surface and completely surrounds it, which further reduces the axial size of the starter head.

In all cases the coupling piece, by means of its skirt and also its bottom integral in one embodiment in a sealed manner with a pinion, protects the frustoconical friction surfaces and prevents these from being soiled, for example by oil and water.

The functioning of the starter head is therefore reliable and it has a long service life.

The fact that the coupling piece is for example integral with the pinion reduces the axial size of the starter head because in particular the bottom of the coupling piece does not extend so as to project and also simplifies the assembly of the starter head.

The starter head and the coupling piece or the pinion and the coupling piece constitute a sub-assembly which can be handled and transported and is captive. This sub-assembly is easy to assembly with the second sub-assembly.

In addition it is possible to produce each of these subassemblies in a single piece or in several pieces preferably from a different material adapted to the function to be performed.

It will also be appreciated that the weight and cost of the starter head are reduced.

According to one characteristic the second stop surface is fixed to a transverse shoulder axially delimiting the second or first frustoconical friction surface.

This arrangement simplifies the driver or pinion still further and increases the mechanical strength of these.

This also makes it possible to produce the driver by moulding from a plastics material, which therefore lightens it.

In addition the axially-acting elastic means exert an action respectively of the driver and the pinion on a mean diameter close, according to circumstances, to the mean diameter of the second or first frustoconical friction surface. In one embodiment the mean diameter of action of the axially-acting elastic means is roughly equal to the smallest diameter of the second frustoconical friction surface.

The action of the axially-acting elastic means on the driver or pinion therefore takes place in a thick area thereof, which is favourable in particular to their location.

Advantageously the skirt is frustoconical in shape in order to reduce further the size and weight of the starter head.

In one embodiment the first stop is carried by an extension of the tubular-shaped skirt constituting the free end of the coupling piece.

The tubular extension has an axial length which depends on the application and in particular on the axial thickness of the axially-acting elastic means and makes it possible not to increase the radial size of the starter head whilst facilitating the assembly of the starter head.

More precisely this tubular extension serves in a simple fashion for fixing a system for holding and closing the complete starter head, the said system comprising the first stop and the axially-acting elastic means.

In one embodiment the mean diameter for friction and/or contact between the frustoconical friction surfaces is equal to or greater than 75% of the diameter of the tubular extension of the skirt.

Other characteristics, aims and advantages of the invention will emerge from a reading of the detailed description which follows, given with reference to the accompanying figures, in which:

DESCRIPTION OF PREFERENTIAL EMBODIMENTS OF THE INVENTION

Figure 1:
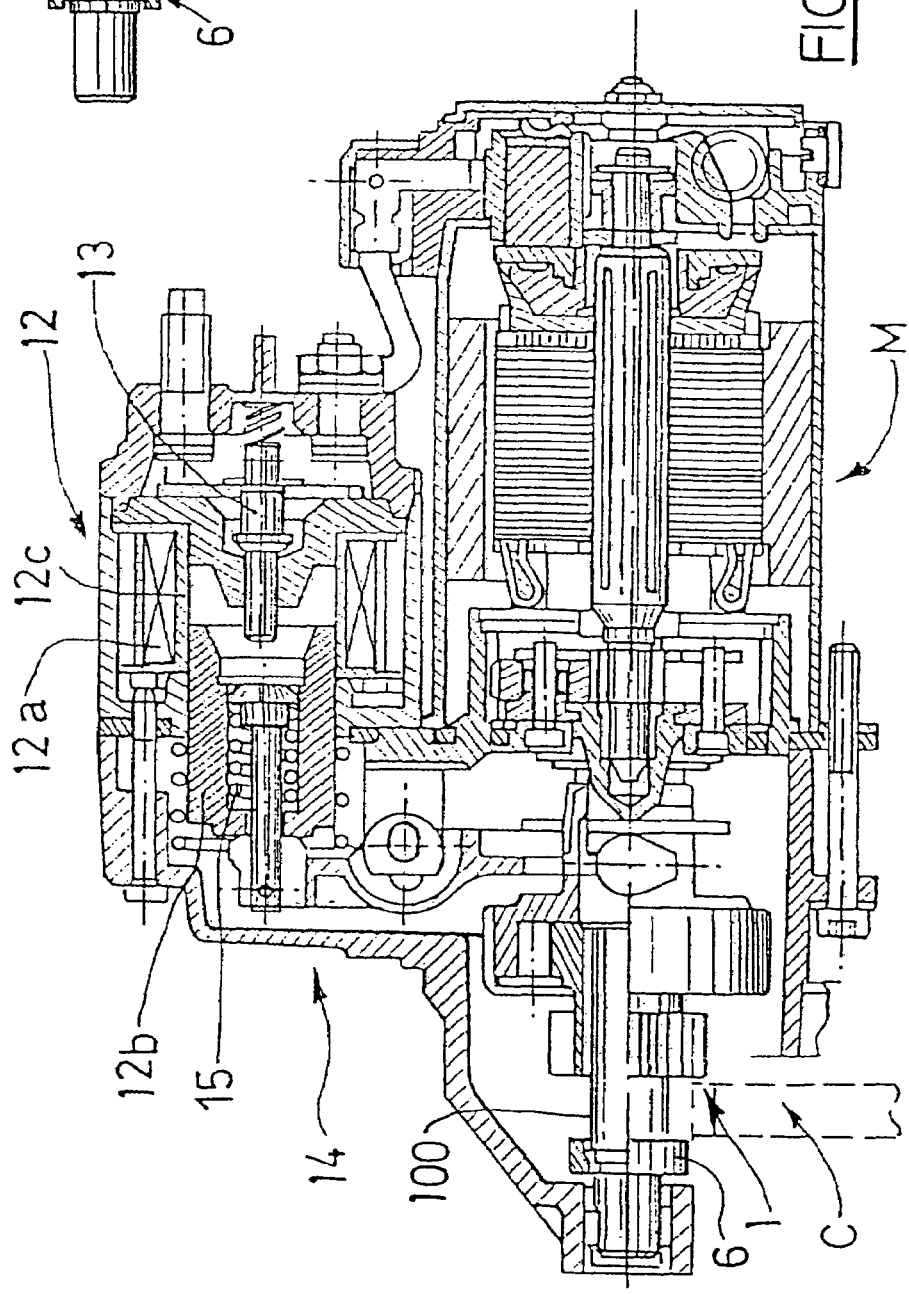
FIG. 1 depicts a motor vehicle starter according to the prior art.

In FIGS. 2 to 8, in order in particular to reduce the number of parts of the starter head to be assembled finally and to increase still further the efficacy and reliability of functioning of the starter head, the starter head of FIG. 1 has, according to one characteristic of the invention, been replaced by a starter head provided with a pinion 1 carrying a first frustoconical friction surface 8 cooperating in a complementary and coaxial manner with a second frustoconical friction surface 8' carried by the driver 2 in order to form a conical clutch (referenced 7 in FIG. 2), whose mean diameter by which the first frustoconical friction surface 8 makes contact with the second frustoconical friction surface 8' is greater than the diameter of the pitch circle of the teeth of the pinion. Here the said mean contact diameter is greater than the diameter of the tip circle of the teeth of the pinion and is, in the event of overspeeding of the pinion with respect to the driver, a mean friction diameter. The conical clutch and a coupling skirt, annular in shape, belong in the aforementioned manner to a coupling device (3) acting between the driver 2 and the pinion 1 in order to couple the pinion to the driver. The coupling skirt is fixed to the pinion (FIGS. 2, 3, 8) or the driver (FIGS. 5, 6), which reduces the number of parts to be assembled in the end and simplifies these. The surfaces 8. 8' have the same cone angle.

According to an important characteristic the skirt carries internally one of the frustoconical friction surfaces 8, 8'. According to another important characteristic the skirt carries at its free end axially acting elastic means, and this in axial projection with respect to the other surface 8, 8' not carried by the skirt.

Figure 2:
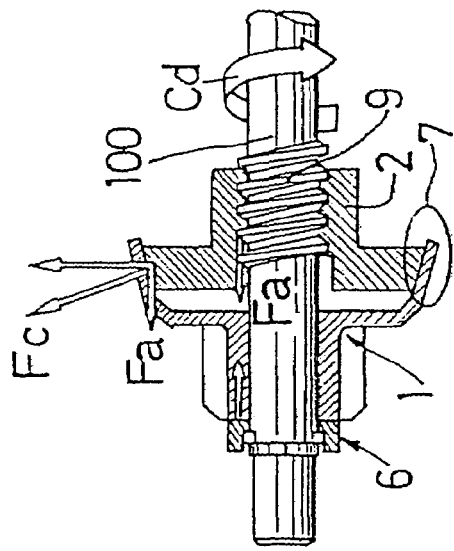
FIG. 2 depicts schematically the forces acting within a starter according to the invention when the starter drives the internal combustion engine of the motor vehicle.
Figure 3:
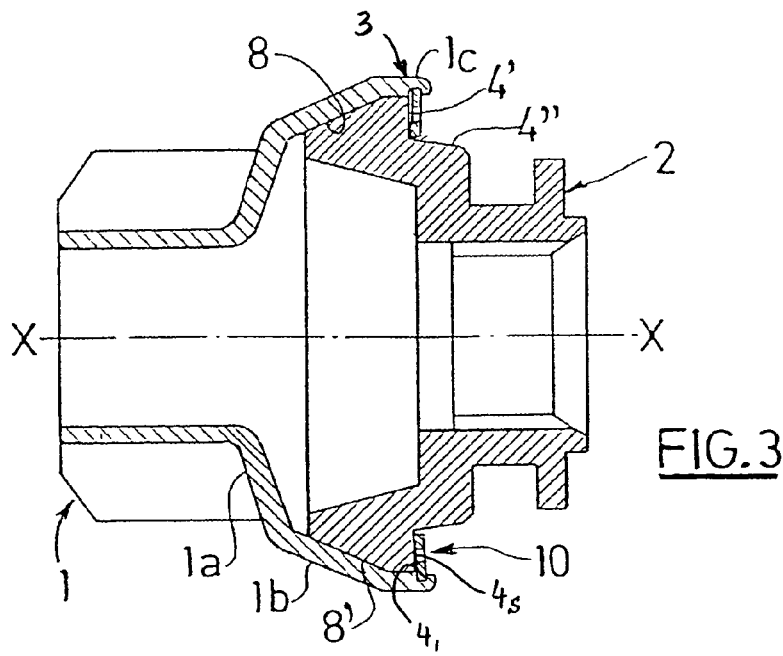
FIG. 3 is a view in axial section of the starter head for a first embodiment according to the invention.
Figure 8:
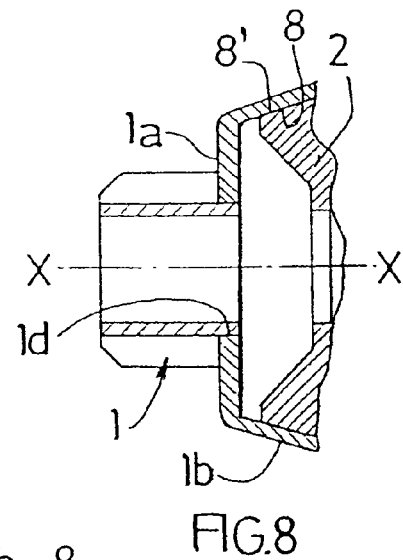
FIG. 8 is a view with partial cutaway similar to FIGS. 3 and 5 for a fourth example embodiment according to the invention.

More precisely, the first frustoconical friction surface 8 in FIGS. 2, 3 and 8 is carried by the internal periphery of a skirt 1b of an annular-shaped and hollow coupling piece, whose annular bottom 1a is fixed to the pinion 1 of the starter head, possibly in several pieces advantageously made from different materials adapted to their inherent function. This bottom has a hole centrally for passage of the output shaft 100, as can be seen in FIG. 2. The coupling piece is produced for example economically by pressing a metal sheet. As a variant the coupling piece is more solid. The skirt 1b of the coupling piece is directed axially towards the driver 2. The driver 2 has at its internal periphery, as in FIG. 1, helical flutes in engagement with helical flutes carried by the external periphery of the shaft 100. Helical flutes 9 therefore act in a complementary manner between the shaft 100 and the driver 2.

The skirt is connected at one of its axial ends, referred to as the first axial end, to the external periphery of the roughly transversely oriented bottom of the coupling piece. In FIG. 3 the bottom 1a is frustoconical in shape, whilst in FIG. 8 it is transverse.

Figure 5:
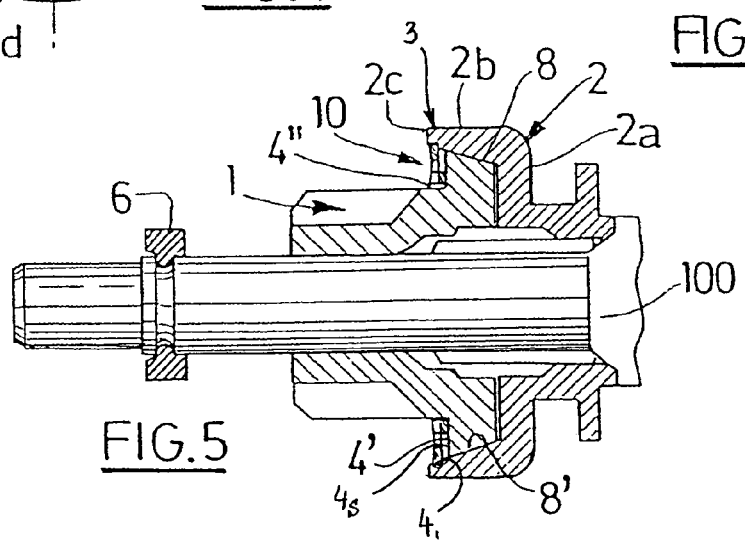
FIG. 5 is a view similar to FIG. 3 for a second example embodiment according to the invention.

In a first embodiment the skirt is solid, as in FIG. 5, being annular in shape, of axial orientation, at its external periphery. Externally the skirt is therefore cylindrical and internally frustoconical in shape in order to carry the first frustoconical friction surface.

In another embodiment, as depicted in FIGS. 3 and 8, again for reduction of the weight of the starter head, the skirt is frustoconical in shape, preferably of constant thickness, so that the coupling piece is roughly in the shape of a bell. This piece is for example made from pressed sheet metal.

According to one characteristic the skirt is extended axially beyond the axial end of greatest diameter, referred to as the outside diameter, of the first frustoconical friction surface 8' by an axially oriented annular end area (1c in FIG. 3). The annular area 1c therefore forms a tubular extension of the first surface 8 of the skirt, internally splayed in shape in the direction of the driver, and extends in axial projection with respect to the second surface 8'.

This area 1c, cylindrical in shape, delimits the second axial end of the skid, that is to say its free end, and carries a first stop $4_l$ extending radially towards the inside, that is to say transversely with respect to the axial symmetry axis X-X of the starter head. The first transverse stop $4_l$ is, in order to reduce the number of parts to be assembled at the end, formed here by means of a groove produced at the internal periphery of this area 1c constituting the free end of the skirt and of the coupling piece. It is the transverse flank of this groove furthest away from the driver 2 which constitutes the first stop $4_1$.

Axially-acting elastic means 10, advantageously made from spring steel, are carried by the skirt 1c and bear on the first stop for action on a second radial, i.e. transverse, stop 4', fixed to the driver 2, and clamping of the second frustoconical friction surface 8' fixed to the driver in contact in a complementary and coaxial manner with the first frustoconical friction surface fixed to the skirt and therefore to the pinion of the starter head. The second frustoconical surface 8' is convex in shape, whilst the first frustoconical surface 8 is concave in shape. In other words the driver 2 carries a male cone at least partly entering a female cone carried by the pinion.

As depicted in FIG. 3, the first surface 8 constituting the radially external friction surface carried by the skirt 1b completely surrounds the second radially internal friction surface 8' carried by the driver 2. FIG. 5 illustrates a second embodiment in which it is the driver 2 which carries the skirt 2b, this skirt 2b then carrying the radially external friction surface 8'. Thus, according to an advantageous embodiment of the invention, the elastic means 10 are carried by the free end of the skirt which carries the radially external friction surface 8, 8'. This embodiment has the advantage of considerably simplifying the design of the conical starter head described in the document FR 2,772,443 in which the skirt which carries the elastic means carries the radially internal friction surface, which requires the production of a ferrule.

These surfaces 8, 8' have a mean diameter greater than the diameter of the tip circle of the pinion 1, 10 so that the mean friction or contact means of the two surfaces 8, 8' is greater than the diameter of the tip circle of the teeth on the pinion. The efficacy and reliability in functioning of the starter head are therefore increased. The axial size is also reduced. In addition the wear on the surfaces is taken up; the first surface 8 being in accordance with one characteristic longer axially than the second surface 8' so that the driver can move even closer to the pinion and the axial size of the starter head is further reduced. The mean contact and friction diameter between the two friction surfaces 8, 8' is therefore equal to the mean diameter of the second surface 8' having at its axial end adjacent to the elastic means 10 a larger diameter than at its other smaller-diameter axial end. The mean diameter is then situated in the middle of the axial length of the second surface 8'; the first surface 8 extending axially on each side of the second surface 8'.

The elastic means (or member) 10 also belong to the coupling device 3 and more precisely constitute. with the first stop, a system for holding or retaining and closing the complete starter head.

Therefore a first sub-assembly is first of all manufactured, comprising the pinion and the coupling piece provided with the first surface 8 and a second sub-assembly consisting of the driver provided at its external periphery with its second surface 8', and then the driver is moved closer with respect to the first sub-assembly by slipping the second surface into the first surface and finally the elastic means 10 are fitted in order to lock the whole.

These elastic means 10 are located with axial compression, that is to say under prestressing, between the first stop $4_l$ and the second stop 4' carried here, in order to reduce the axial size of the starter head still further, by a transverse shoulder $4_s$ on the driver axially delimiting, according to one characteristic, the second surface 8' at its largest diameter. The shoulder $4_s$ is formed by means of an annular removal of material at the external periphery of the body of the driver, thus making it possible to at least partly house the elastic means 10. This removal of material is delimited by the transverse shoulder $4_s$ and by an annular surface 4" roughly of axial orientation connected to the internal periphery of the shoulder $4_s$. The elastic means 10 are here housed entirely in the removal of material and bear directly on the shoulder $4_s$ or indirectly on it by means of a covering. In all cases the stop 4' is carried by the shoulder $4_s$.

Naturally, in a variant when problems of radial size are not posed, the first stop is carried by an area extending the first surface 8, which makes it necessary to increase the radial size of the first stop.

Figure 4:
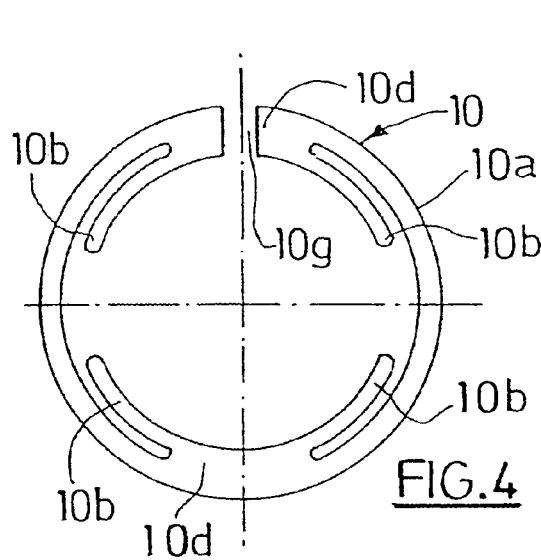
FIG. 4 is a front view of the elastic ring of FIG. 3.

As can be seen in FIG. 4, the elastic means 10 comprise a ring 10a which is not closed and therefore open at 10g. The opening 10g, here radial, confers radial elasticity on the ring 10a, which can then be used as a circlip which is inserted in the aforementioned groove in the extension 1c, closing the slot 10g. This ring 10a is advantageously made from spring steel. In a variant the opening 10g is inclined.

Figure 7:
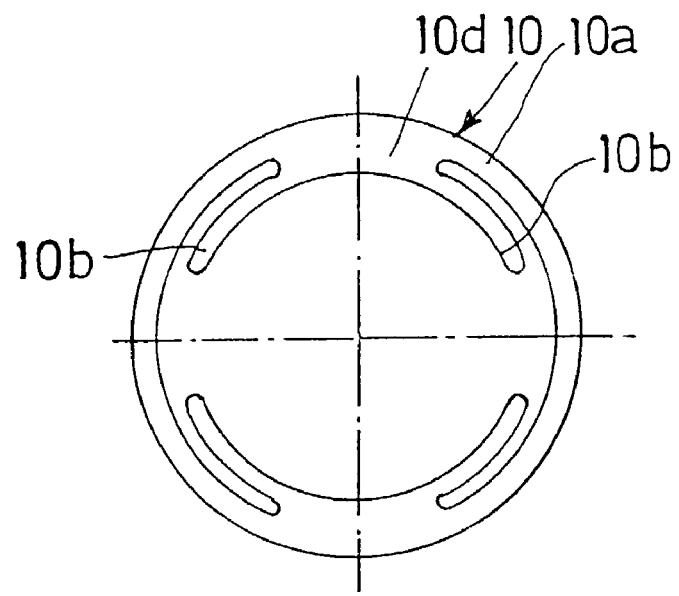
Figure 9:
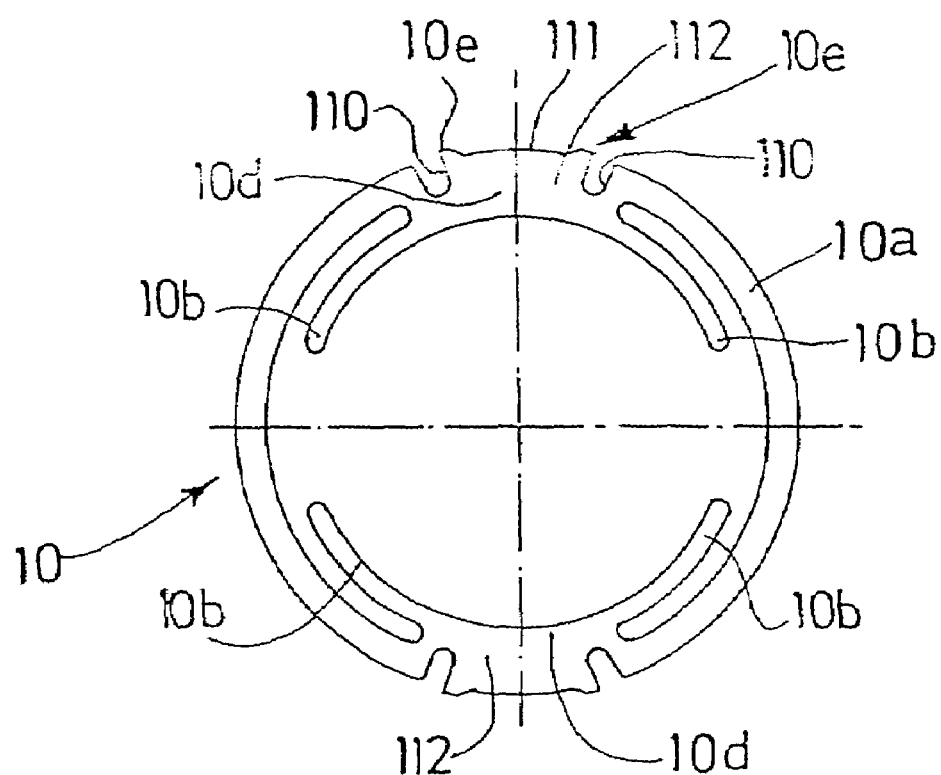
FIGS. 9 and 10 are respectively a front and side view of a variant embodiment of FIG. 7.

In a variant the ring 10a is closed, as can be seen in FIGS. 7 and 9, and has at its external periphery at least two radial lugs, preferably diametrically opposed, each adapted to pass through an axial passage opening out in the aforementioned groove comprising the first stop for a mounting of the bayonet type.

In a variant the first stop extends in radial projection towards the inside with respect to the internal periphery of the extension over a low height and is attached, preferably in advance, by welding, crimping or riveting to the extension 1c. The welding can be of the laser type. The crimping can be carried out in a similar manner to that of FIG. 6 when the skirt is solid. In a variant the first stop is a ring which has in projection radial lugs at its external periphery. These lugs are each engaged in a complementary manner in a hollow produced at the free end of the skirt. Next the lateral edges of the hollows are crushed in order to carry out crimping; the skirt advantageously being made from pressed sheet metal. In a variant the lugs can be welded to the lateral edges of the hollows.

In a variant the first stop is produced by a folding over of material radially towards the inside of the free end of the extension 1c. The ring 10a is also mounted by closing the slot 10g.

All combinations are possible, the starter head comprising two sub-assemblies and here a supplementary elastic means 10. This elastic means 10 is a member for closing the starter head since it locks the two sub-assemblies 1, 2 of this starter head.

More precisely the elastic means 10 are mounted under prestressing between the aforementioned stops and make it possible to keep the second frustoconical surface 8' of the driver under pressure against the first frustoconical surface 8 fixed to the pinion 1, 10. It should be noted that the mean diameter of the first stop, that is to say of the groove, is greater than the mean diameter of the second stop 4'.

The elastic means 10 exert a predetermined force which is substantially constant over time and of a relatively low value which depends on the application.

This initial pressure produces a friction torque between the driver and the pinion which is always, by construction, greater than the torque necessary for the screwing and forward movement of the starter head on the shaft 100.

This condition allows the auto-initiation of the movement of the starter head between its idle position and its advanced position against the working stop, referenced 6 in FIG. 2, at the start of the phase of driving the vehicle engine via the starting ring. When the pinion reaches the stop 6 there is compression of the surfaces 8, 8' against each other with locking.

This movement locking between the pinion and the driver depends in particular on the angles and diameters of the frustoconical friction surfaces.

As can be seen in FIG. 2, during the driving of the internal combustion engine of the motor vehicle by the electric motor of the starter, the torque Cd—generated by the starter at the output shaft 100 carrying the driver 2 and converted by the device with helical flutes 9 acting between the driver 2 and the shaft 100—creates an axial force Fa.

This force Fa is itself decomposed at the frustoconical friction surfaces in order to create a normal contact force Fc, which generates a tangential force Ft at the frustoconical surfaces 8, 8' which is a function of the coefficient of friction between these surfaces. The value of this force Ft multiplied by the mean radius of contact of the frustoconical friction surfaces determines the torque Ce transmitted by the conical clutch 7.

So that the pinion is driven normally without sliding it is necessary for the relationship Ce>Cd always to remain true.

All this depends on the application since the coefficient of proportionality between Cd and Fa depends on the angle of inclination of the flutes 9, the mean radius of these flutes and the coefficient of slip between the output shaft 100 and the driver.

The coefficient of proportionality between Fa and Fc depends on the angle of the cone between the two frustoconical friction surfaces.

The value of Ft is related to Fc and to the coefficient of friction fc between the two materials of the frustoconical friction surfaces of the clutch 7. To prevent any jamming it is ensured that the tangent relationship (a)>f'c, in which a is the value of the half-angle at the apex of the cone of contact between the frustoconical friction surfaces and f'c the coefficient of adhesion.

All these values are calculated according to engineering formulae known per se and dependent on the applications.

These formulae involve the coefficient of friction between the flutes of the shaft and the driver, the mean radius of the flutes, the angle of the cone of the surfaces 8, 8' and the coefficient of friction of these. All this influences the choice of materials of the driver, skirt and pinion.

When the vehicle engine has started the pinion 1 turns more quickly than the output shaft 100, which enables the starter head to be unscrewed on the shaft 100. The axial force previously transmitted disappears and all that remains is the weak residual torque due to the elastic means 10 which is transmitted to the electric motor of the starter. During this short overspeed phase the clutch behaves like a freewheel device with a rotary movement between the surfaces 8, 8'. The mean diameter of contact between the two surfaces 8, 8' is therefore also a friction diameter in the case of overspeeding.

The object of the invention is to minimise this residual torque whilst complying with the relationship Ce>Cd. Throughout the service life of the starter head.

Thus, according to the invention, a starter of the type indicated above is characterised in that the elastic means 10 comprise tongues which are elastically deformable axially 10b and in that the tongues extend circumferentially.

According to one characteristic of the invention, the tongues 10b extend axially in the same direction in order to come into abutment against the second stop.

By acting on the circumferential length and on the thickness of the tongues, the axial force developed by them is well controlled.

In FIG. 4 the tongues 10b are in the form of arms 10b which extend inside the open ring 10a. The arms 10b are in the form of an annular sector extending circumferentially in cantilever on each side of a fixing (or anchoring) area 10d on the ring 10a. One of the areas 10d is affected symmetrically by the radial slot 10g. The two areas 10d are diametrically opposed so that the arms 10b extend in reverse orientations axially in the same direction. direction.

The internal periphery of the two arms 10b associated with the same area 10d is in the form of an arc of a circle extending over more than 90°. Naturally the number of areas 10d and arms 10c can be increased.

The tongues in the form of arms 10c belong to the axially acting elastic area of the elastic means 10, also comprising the areas 10d.

This elastic area 10b extends radially below the ring 10a, which thus has an inside diameter greater than that of the external periphery of the arms 10b. The elastic means 10 comprise two areas 10a, 10b, namely an internal elastic area divided into tongues 10b, here in the form of arms, circumferentially oriented, and an external area 10a for stopping the pinion 1 in translation, in the form of a ring 10a, here open and diametrically elastic.

The free ends of the tongues 10b are offset axially with respect to the stop area according to the application.

The areas 10d are areas for connection to the ring 10a.

According to another characteristic these tongues have a zone of inflection. i.e. an area where there is a change of direction between their anchoring end at the area 10d and their free end in order better to control the force which they exert on the second stop 4'. In general terms the tongues are curved axially in the direction of the driver 2 in order to keep the surfaces 8, 8' in contact. In a variant the tongues are inclined axially, from their end at the anchoring area 10d, in the direction of the second stop 4'. In a variant an inclined area connects the free end of a tongue to its anchoring end at the area 10d. By virtue of the inclined area creating a fold, the elasticity of the tongue is well controlled and the free end of a tongue can extend parallel to the second stop.

The free end of the tongue can be curved for contact at one point with the second stop.

The tongues 10b in general terms are offset axially with respect to the ring 10a, in the direction of the second stop 4'.

This axial offset determines the prestressing of the tongues and therefore depends on the application.

It will be appreciated that the arms 10b have a great circumferential length, which is favourable for controlling the axial force developed by these arms.

In a variant the tongues are cut circumferentially in the wider ring 10a.

The coupling piece therefore makes it possible to connect the driver to the pinion via the frustoconical friction surfaces and replaces the cap in FIG. 1. The coupling piece is fixed to the pinion whilst being in a single piece therewith in FIGS. 2 and 3 or as a variant (FIG. 8) attached fixedly to it. The walls of the coupling piece (its bottom and skirt) are continuous so that the coupling piece is impervious, no opening existing between the bottom of the coupling piece and the pinion. This is favourable for the operating reliability of the starter head since the surfaces 8, 8' are not soiled by leakages of oil, water etc.

The starter head is also simplified since it has no external ferrule, unlike the embodiment in FIGS. 3 and 5 of the document FR-A-2 772 433.

For simplicity in the figures the assembly consisting of pinion and coupling piece will be referred to as the bell pinion.

Thus in FIGS. 2 and 3 the bell pinion is in a single piece whilst being made from a single material or two materials, whilst in a variant (FIG. 8) the bell pinion is in two pieces, namely the pinion and the bell; each piece then being chosen optimally according to its function to be performed.

In the figures the bell pinion comprises on the one hand a toothed part constituting the pinion 1 and on the other hand a frustoconical part, referenced 1b in FIG. 3, belonging to the coupling piece.

The toothed part is tubular in shape and has in cross-section the teeth with flanks curved roughly in trapezoidal shape, necessary for meshing with the starting ring of the internal combustion engine of the motor vehicle. The pinion therefore has teeth defined in a known fashion by a tip circle, a pitch circle and a root circle.

It is the internal periphery of the frustoconical part which directly or indirectly constitutes the first frustoconical friction surface. This is because the internal periphery of the frustoconical part 1b can rub directly against the second frustoconical friction surface belonging to the driver or indirectly against the second frustoconical friction surface, at least one of the two frustoconical friction surfaces then being provided with a covering such as a friction lining fixed for example by adhesive bonding. This makes it possible to control in particular the aforementioned force Ft.

As a friction or rubbing lining it is possible to use a lining of the type described in the document EP A 0 816 707, comprising a mat of fibres impregnated with a thermosetting resin. These fibres are carded in order to form a card web and advantageously have a length of at least 40 mm. Glass is for example incorporated in the mat. For more information reference should be made to this document. With this type of lining remarkable stability of the coefficient of friction of the material is obtained, as well as low wear.

The first frustoconical friction surface therefore belongs to the internal periphery of the skirt of the coupling piece or is attached to the said internal periphery.

The same applies to the second frustoconical friction surface, which is formed either directly by the external periphery of a frustoconical surface belonging to the driver 2 or is attached to the said surface of the external periphery.

In all cases at least one of the two frustoconical surfaces 8, 8' has grooves extending from one axial end to the other axial end of the frustoconical surface concerned, in a rectilinear or curved fashion. In a variant the grooves extend circumferentially. A network of circumferential and rectilinear and/or curved intersecting grooves can be produced. This network can comprise circumferential grooves connected to the axial ends of the frustoconical surface concerned by distinct grooves extending in a rectilinear or curved manner. All combinations are possible. For example, the grooves are provided at the external periphery of the second surface, or as a variant at the internal periphery of the first surface.

By means of the grooves the dust is discharged and the detachment of the two surfaces with respect to each other is assisted, in particular in the case of overspeeding.

As on the pinions of conventional starter heads, the teeth on the toothed parts 1 are preferably provided at their free end, on the opposite side to the driver 2, with a bevel for facilitating the entry of the pinion into the starting ring visible at C in FIG. 1.

In these FIGS. 2 and 3 the frustoconical bottom 1a is roughly of transverse orientation since it extends in an inclined fashion with respect to the axial symmetry axis X-X of the starter head visible in FIGS. 3 and 8. This axis is at the same time the axis of symmetry of the shaft 100. In a variant, FIG. 8, the bottom extends perpendicular to the axis X-X. In fact it is possible to standardise the driver and, according to the radial and axial size of the pinion, incline the bottom 1a more or less or make it transverse. All this depends on the application.

Thus in FIG. 3 the pinion 1 has at its end turned towards the driver 2 an inclined extension 1a constituting the bottom of the coupling piece in the form of a bell and connecting the parts 1, 1b together.

The bell pinion is for example obtained by casting. Advantageously the bell pinion is obtained by sintering whilst being made from one material or preferably two materials.

The two-material sintering is very advantageous since there is a choice for the toothed part of a grade of material more specifically adapted to the requirements of the meshing with the starting ring (mechanical strength, resistance to wear, low noise emission etc) whilst the frustoconical part is specially adapted to the requirements of the clutch 7 (resistance to wear, value of the coefficient of friction etc).

The toothed part 1 is obtained for example by extrusion, sintering, cutting from a bar or pressing. This toothed part 1 is in a variant distinct from the bell, which has a plate with a central hole for passage of the shaft 100 and constituting the bottom of the bell. This plate 1a is extended at its external periphery by the frustoconical skirt 1b, itself extended by the tubular extension 1c. The first frustoconical surface 8 consists of the internal periphery of the skirt 1b.

In a variant, as can be seen in FIG. 8, the plate 1a is attached at its internal periphery by welding to the pinion having for this purpose at its internal periphery a tubular extension 1d extending in axial projection towards the driver and making it possible to centre the plate 1a at its internal periphery. This plate is fixed axially in one direction by the adjacent axial end of the teeth of the pinion and in the other direction by the welding carried out at the free end of the extension. The welding is in one embodiment carried out continuously, or in a variant discontinuously. The welding is of the laser type, of the friction welding type or of the arc welding type.

In a variant the fixing is carried out by crimping, the free end of the aforementioned tubular extension being folded over in contact with the plate 1a itself in abutment on the teeth of the pinion 1. In this case use can be made of complementary connections, for example of the polygonal type, to lock the plate with respect to rotation. The rotational locking of the bell on the pinion is carried out in general terms by cooperation of shapes. The teeth on the pinion can be used to effect this fixing. For example the plate 1a is dished locally in order to form at least a projection entering in a complementary manner between two consecutive teeth on the pinion. In a variant the plate is dished in the opposite direction in order to form at least one hollow in which at least the end of one tooth on the pinion enters in a complementary manner, this tooth being enabled to cooperate with the lateral edges of the hollow. The number of projections and hollows depends on the application.

In a variant it is possible to make connections by shrinking on.

In all cases an axial and rotational immobilisation of the bell with respect to the pinion, that is to say a fixing, is obtained.

In a variant the pinion 1 is made from sintered material and the bell, made from solid metal, is mounted, by means of its plate, with slight clamping on the projecting tubular extension 1d of the pinion 1 so as to remain correctly positioned on the pinion during handling of the assembly thus formed before this assembly is passed through a furnace for sintering of the pinion. During this passage through the furnace the metal of the pinion swells and thus provides, in addition to the metallurgical connections of the sintering, definitive immobilisation of these two parts. Aforementioned connections by cooperation of shapes, such as polygonal nesting, can take place in order to contribute to the rotational connection between these two parts.

In a variant the bell is also made from sintered material, preferably different from that of the pinion, in order to obtain good friction characteristics. The two parts are then preassembled before passing through the sintering furnace. The coefficient of swelling of the pinion is at least as great as that of the bell so as to preserve close contact between these two parts and to assist the creation of strong metallurgical connections. After the sintering a single-piece assembly is obtained with different mechanical characteristics according to the areas in question.

In one embodiment the toothed part is obtained by two-material sintering in order to obtain on the one hand good properties of sliding along the shaft 100 and on the other hand good properties for meshing with the starting ring.

It is possible to conceive that this toothed part may itself be in two pieces, namely an internal sleeve made from material allowing good sliding along the shaft 100, and a pinion mounted on the external periphery of the sleeve and having a material exhibiting good properties for meshing with the starting ring. The tubular extension 1d then constitutes one of the axial ends of the sleeve.

This can be achieved in the same way as with the assembly of the bell with the pinion. For example, the toothed part is mounted for clamping on the extension 1d of the sleeve before the operation of sintering at least one of these pieces. When the two pieces are sintered, the coefficient of swelling of the sleeve is at least equal to that of the toothed part. In a variant a connection by shrinking on is effected.

In a variant the sleeve is fixed to the bell whilst being in a single piece therewith or fixed to it. The solution with an attached sleeve is advantageous since, for a given shaft size 100, it is possible to standardise the sleeve, if necessary with the bell, and adapt the pinion mounted on the external periphery of the sleeve to each application, in particular with regard to its length. It is also possible to axially position the toothed part as required with respect to the sleeve with a greater axial length than the toothed part.

The bell pinion is therefore in one, two or three pieces. It should be noted that the bottom of the bell is connected to the skirt thereof either by means of a rounded area or by means of a frustoconical area.

The same reasoning can be made for the driver 2, which is therefore in one or more pieces each made from a different material in order to fulfil its inherent function in an optimum fashion. For example, as described in the document FR A 2 772 433, the driver can have a metallic piece, such as a ring provided with at least one collar, attached to the body of the starter head in order to cooperate with the fork of the mechanical means 14 in FIG. 1. The aforementioned ring comprises, in one embodiment, two collars so that it has a U-shaped cross-section for receiving the fork.

As can be seen in the figures the driver comprises three portions, namely a first portion having at its external periphery the second frustoconical surface. This first portion extends in axial and radial projection with respect to a second portion, constituting the sleeve of the driver and having on the inside the helical flutes adapted to cooperate in a complementary manner with the helical flutes on the shaft 100. An annular groove for receiving the fork of the mechanical means 14 of FIG. 1 is provided at the external periphery of the second portion. This groove, delimited by two transverse flanks adapted to cooperate with the fork of the means 14, belongs to the third portion of the driver 2 and is offset axially with respect to the first portion. This groove extends radially above the flutes of the second portion whilst being shorter axially. The second frustoconical surface, advantageously provided with grooves in the aforementioned manner, extends in radial projection with respect to the groove and is connected to the groove via the removal of material 4', 4" effected in the first portion for housing the elastic means 10. A frustoconical face connects the relevant end of the second portion to the smaller-diameter end of the second frustoconical surface in order to reduce the quantity of material of the driver, here made from mouldable plastics material advantageously reinforced with fibres. In a variant anti-wear coverings are made on one of the two flanks delimiting the groove, in particular when the fork of the mechanical means 14 is metallic. These coverings consist for example of metallic rings fixed by moulding onto the flanks of the groove, or in a variant half-rings or a U-shaped piece fixed by snapping onto the flanks of the groove. In a variant the flank of the groove furthest away from the pinion is formed by means of an attached ring, all combinations being possible. The second friction surface can be formed also by means of a covering, such as the aforementioned friction lining, so that the body of the driver and therefore the second portion thereof is advantageously made from a material having the required qualities for cooperating with the flutes on the shaft 100. The driver 2 as a variant is obtained by sintering from a single material or as a variant several materials like the pinion. It will be appreciated that, when the bell and/or the driver are made from sintered material it is possible to incorporate in this the required fillers for obtaining the desired coefficient of friction for the surfaces 8, 8'. For example these surfaces can contain copper powder, carbon for example in the form of graphite, silica and molybdenum.

The fork of the means 14 is advantageously made from plastics material in order to limit the phenomena of incrustation in the driver and reduce noise. In a variant the groove and therefore the second portion of the driver can extend radially above the second surface 8' and the skirt of the coupling piece.

Naturally it is possible to reverse the structures, the annular shaped and hollow coupling piece then belonging to the driver 2.

The free end of the skirt 2b of the coupling piece extends in axial projection with respect to the first surface 8 and carries the elastic means 10.

Thus in FIG. 5 the skirt 2 and the plate 2a of the coupling piece in the form of a bell belong to the driver 2, which carries at its external periphery a female cone in which a male cone carried by the pinion enters. The second frustoconical friction surface 8' surrounds the first frustoconical friction surface whilst being axially longer than it. It is the driver 2 which carries the bell provided with an annular skirt 2b directed axially towards the teeth of the pinion. This skirt is of non-constant thickness whilst being delimited at its external periphery by an axially oriented annular wall, that is to say cylindrical, and at its internal periphery by the second concave shaped surface 8', the first complementary surface 8 being convex in shape. The skirt is connected, by means of the transverse plate 2a, to the aforementioned second portion of the driver 2. The bell belongs to the first portion of the driver 2. The mounting groove of the ring in FIGS. 3 and 4 belongs to the free end of the skirt, whilst the removal of material housing the elastic means 10 is formed in a supplementary portion of the pinion 1 equivalent to the first portion of the driver of the embodiment in FIGS. 3 and 4. It is therefore possible to use the same ring as for FIGS. 3 and 5.

It will be noted that the supplementary portion of the pinion constitutes an extension extending in radial and axial projection with respect to the teeth of the pinion 1. It is the external periphery of this extension which carries the first surface 8, whose mean diameter constitutes the mean contact diameter of the surfaces 8, 8'. This mean diameter is greater than the diameter of the tip circle of the toothed part of the pinion 1.

In FIGS. 3 and 5 the smallest diameter of the first surface 8 is greater than the diameter of the tip circle of the toothed part of the pinion 1. The extension is here cast in one piece with the pinion 1.

The skirt 2b is solid so that the groove is produced at the free end of the skirt 2b in the projecting part of the second surface 8' with respect to the first surface 8'. The plate 2a, here transverse or in a variant frustoconical, and the skirt 2b are in one piece with the driver 2. In a variant the bell is attached to the driver for example in the same way as the assembly in FIG. 8. In this case the second portion of the driver has on the inside a projecting tubular extension shouldered for mounting an axial fixing in one direction of the plate 2a. All the aforementioned forms of assembly are transposable in this configuration mode and vice-versa.

It should be noted that the plate 2a forms one of the flanks of the reception groove of the fork of the means 14.

Naturally as a variant (FIGS. 6 and 7) the ring 10a is continuous and is extended at its external periphery by a tubular part 10f provided at its free end with lugs 10c folded over in contact with an inclined face 2d belonging to an annular protuberance 2e which the skirt 2a has in radial projection at its external periphery. This protuberance is connected to the transverse face of the free end of the skirt and has a cylindrical centring surface 2f for the tubular part 10f.

The elastic means therefore comprise an area for stopping the pinion in translation in the form of an annular cap carried by the skirt.

The transverse face of the free end of the skirt constitutes the first stop.

The inclined face 2d can be provided with hollows for rotationally locking the cap by cooperation of the lugs 10c with the lateral edges of the hollows. The cap is immobilised axially by means of the face 2d and the face of the free end of the skirt.

In the preceding figures the axial immobilisation is effected with a slight clearance by mounting of the ring 10a in the groove.

In a variant a groove is produced in the surface 2f and the tubular part 10f is pressed locally into the groove. The crimping lugs 10c are then omitted.

In a variant the tubular part 10f is pressed in locally by forward movement towards the inside and the mounting of the tubular part 10f on the surface 2f is achieved by snapping the pressed areas of the part 10f into the groove of the part 10f.

In a variant the ring 10a has axial lugs at its external periphery each provided at their free end with a hole for mounting by snapping on a complementary stud issuing from the external periphery of the skirt. To do this each hole belongs to an elastic area formed for example by means of a concertina folding.

In a variant the axial lugs are provided at their free end with elastically deformable inclined projections for forming claws intended to come into engagement by snapping on with the studs.

Figure 10:
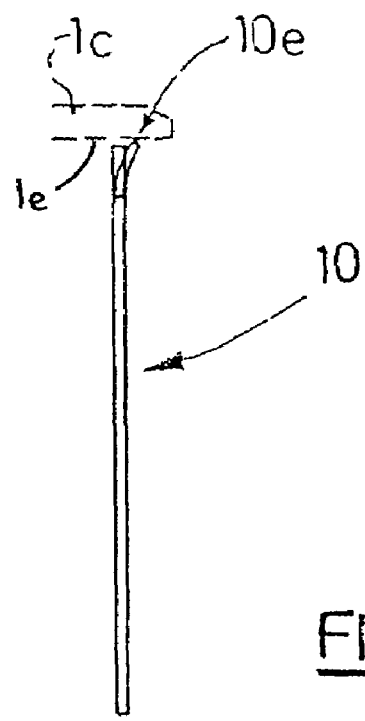

In a variant the claws are formed by means of fixing areas 10d as can be seen in FIGS. 9 and 10. These claws 10e then come into engagement elastically with an internal periphery 1e of the extension 1c or 2c of the skirt constituting the free end thereof. FIG. 10 shows in dotted lines part of the extension of 1c. In this case the ring 10a is then continuous and has four arms 10b and two fixing areas 10d as in FIG. 7. The areas 10d are delimited circumferentially at their external periphery by two blind slots 110 each connected to a claw 10e extending in radial projection with respect to the external periphery of the ring 10a. The height of these claws is here slight. These claws 10e are connected to each other by a flat portion 111 delimiting the external periphery of a fixing area 10d.

The claws are each delimited by the edge of a slot 110, a rectilinear portion constituting the external periphery of the claw 10e and an inclined portion for connecting to the flat portion 111.

Each fixing area 10d thus has at its external periphery a tongue 112 less wide circumferentially than the said area 10d.

Each tongue 112 has a claw 10e at each of its ends. The tongues 112 can flex axially.

The outside diameter of the claws 10e is slightly greater than the inside diameter of the extension 1c so that, when the elastic means are fitted axially in the extension 1c, the tongues flex axially so that the claws remain in engagement under pressure with the internal bore of the internal extension 1c, as can be seen in FIG. 10. When the elastic means 10 are subjected to a force acting in the opposite direction to that of the fitting in, the elastic means lock by bracing. The tongues 112 have roughly the shape of the head of a cat with two ears formed by claws 10e.

The groove in FIGS. 3 and 5 can be omitted. In a variant the groove is kept so that the axial locking of the elastic means 10 is improved.

In a variant the groove is replaced by hollows for receiving the claws 10e.

Advantageously the claws 10e are mounted under pressure in the groove or the hollows in order to prevent any movement following vibrations.

As is obviously clear from the description and drawings, the torque transmission capacity of the starter head is increased by virtue of a large mean friction diameter for a given diametral size. The number of parts as well as the axial and diametral size of the starter head are also reduced. A good seal is obtained with regard to splashing of oil or water directed towards the pinion by virtue of the bell. There is a possibility of choosing different materials, one well suited to the mechanical characteristics required by the pinion, the other being well adapted to the requirements of friction and resistance to wear of the conical clutch.

Figure 6:
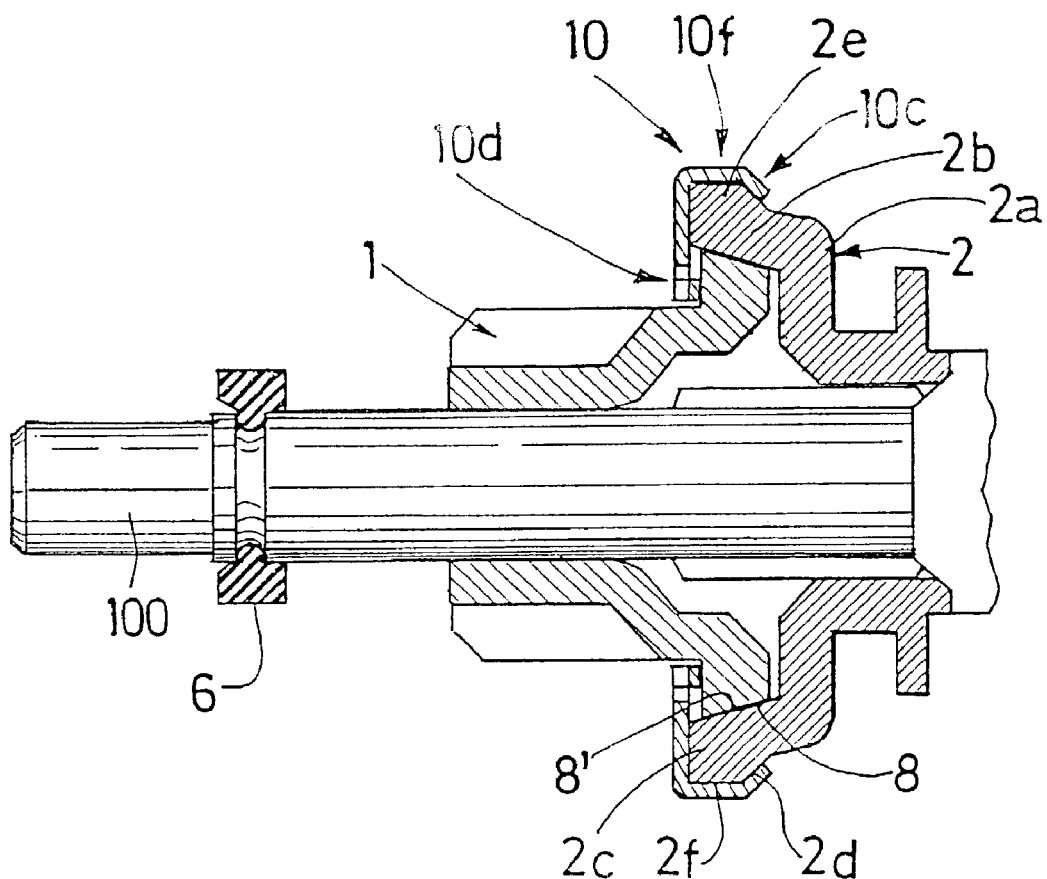
FIGS. 6 and 7 are views similar to FIGS. 3 and 4 for a third example embodiment according to the invention.

In a variant the cap in FIGS. 6 and 7 can replace the cap in FIG. 5 of the document FR-A-2 772 433, which allows a reduction in the number of parts.

Advantageously use is made of an electronic control device for the electrical supply to the winding 12a and the electric motor of the starter in order to reduce the duration of the "freewheel" operating phase of the conical clutch and to be independent of the reaction time of the driver. For example, the electronic device is of the type described in the document FR A 2 795 884 supplying the winding 12a by means of a transistor according to a square-wave voltage of the "Pulse Width Modulation" (PWM) type in French.

More precisely the effective current in the winding 12a is varied during the movement of the core 12b towards its contacting position, in order to close the moving contact 13 and supply the electric motor M.

During this movement there are adopted:
a first driving phase with a sufficiently high effective current to move the core 12b, then
a second driving phase with a weaker effective current,
during the second phase, after a predetermined or given time, a continuous increase in the effective current is implemented.

For more information reference should be made to this document.

By virtue of the electronic device it is possible to choose a less noble friction material for the friction surfaces 8, 8' since the overspeed phase and therefore the phase of sliding between the two surfaces is better controlled. This makes it possible to reduce costs.

Advantageously, in order to improve the conical-clutch starter head, a torsion damper with circumferentially acting elastic means and/or a torque limiter are in a variant associated with the starter head.

Thus, in a first embodiment, the torsion damper and the torque limiter are associated with the reduction gear with epicyclic train of FIG. 1 interposed between the electric motor and the output shaft 100 on which the driver 2 is mounted.

For this purpose it is possible to adopt for example the solution described in the document FR 99 16726 filed on Dec. 30, 1999. The torque limiter is then interposed axially between the ring of the reduction gear and a plate of a housing inside which the ring is mounted for rotation.

The elastic means then consist of at least one elastically deformable damper block, being for example made from elastomer, rotationally connecting to the housing a disc belonging to the torque limiter. In a variant the starting ring belongs to the secondary mass of a damping flywheel connected to the gearbox of the motor vehicle. This secondary mass is connected by a torsion damper and a torque limiter to a primary flywheel connected to the vehicle crankshaft, as described for example in the document FR A 2 598 475.

In a variant only one of the two torque limiting or torsion damping devices is present.

In a variant it is possible to provide the aforementioned two devices.

The presence of a fork is not obligatory. The starter can thus have the constitution described in the document EP-A-0 867 613 describing a solution with a reduction gear whose output shaft acts on the starter head.

The invention claimed is:

1. A motor vehicle starter comprising a starter head provided with a pinion, a driver and a coupling device with a conical clutch for coupling the pinion to the driver, the conical clutch comprising a first frustoconical friction surface fixed to the pinion and a second frustoconical friction surface complementary in shape to the first surface and fixed to the driver, the coupling device including a hollow-shaped coupling piece having a bottom and an annular skirt extending from the bottom axially towards one of the pinion and the driver and an axially acting elastic member bearing on a first stop fixed to the skirt of the coupling piece for acting on a second stop fixed to one of the pinion and the driver for biasing the pinion toward the driver, wherein the axially acting elastic member comprises a ring and axially deformable tongues extending from the ring circumferentially, wherein the tongues are bent axially so as to be offset axially with respect to the ring in the direction of the second stop, and wherein the tongues are in the form of arms which extend inside the ring.

2. The starter according to claim 1, wherein each of the tongues is additionally bent in a zone of inflection spaced from an anchoring end of the tongue.

3. The starter according to claim 1, wherein each of the tongues has an inclined area connected to a free end of the tongue.

4. The starter according to claim 1, wherein free ends of the tongues are curved for a contact with the second stop.

5. The starter according to claim 1, wherein the elastic tongues are connected to an internal periphery of the ring by means of anchoring areas.

6. The starter according to claim 5, wherein each of the arms of the tongues is in the form of an angular sector extending circumferentially in cantilever on each side of the anchoring area connecting the sector to the ring.

7. The starter according to claim 6, wherein the ring has a slot so as to form an incomplete ring.

8. The starter according to claim 7, wherein the slot is a radial slot symmetrically affecting the anchoring area connecting at least one of the tongues to the ring.

9. The starter according to claim 7, wherein the ring of the axially acting elastic member is in the form of a circlip and is received in a groove produced at the internal periphery of a free end of the skirt.

10. The starter according to claim 5, wherein the axially acting elastic member has claws intended to come into engagement elastically with an internal periphery of a free end of the skirt of the coupling piece.

11. The starter according to claim 10, wherein the claws belong to tongues formed at the external periphery of the anchoring areas by means of blind slots, and wherein the claws extend in radial projection with respect to the ring.

12. The starter according to claim 1, wherein the ring is extended at its external periphery by an axially oriented part in order to form a cap.

13. The starter according to claim 1, wherein the elastic member is carried by the skirt of the coupling piece and in that the said skirt carries internally one of the first and second surfaces.

14. The starter according to claim 13, wherein the skirt of the coupling piece is fixed to one of the pinion and starter head and includes the first friction surface associated with the pinion and the second friction surface associated with the starter head.

15. The starter according to claim 14, wherein a mean diameter of contact of the first surface with the second surface is greater than the diameter of a tip circle of teeth on the pinion.

16. The starter according to claim 13, wherein the elastic member is carried by a free end of the skirt which carries the radially external friction surface.

17. The starter according to claim 13, wherein the first or second surface carried by the skirt is longer axially than the other second or first surface.

18. The starter according to claim 1, wherein the elastic member is carried by a free end of the skirt and in that the elastic means extend in axial projection with respect to the said other second or first surface.

19. The starter according to claim 18, wherein a largest-diameter axial end of the other surface is delimited by a transverse shoulder carrying the second stop for location with axial compression of the axially acting elastic means between this second stop and the first stop carried by the free end of the skirt of the coupling piece.

20. The starter according to claim 18, wherein a transverse shoulder is extended at its internal periphery by an annular surface of roughly axial orientation delimiting with the shoulder a removal of material in order to at least partly house the axially acting elastic member.

21. The starter according to claim 18, wherein the cap is fixed to the free end of the skirt at the external periphery thereof.

22. The starter according to claim 1, wherein the skirt of the coupling piece is frustoconical in shape.

23. The starter according to claim 1, wherein at least one of the first and second friction surfaces includes a friction lining.

24. The starter according to claim 1, wherein the pinion is made as a single piece with the coupling piece roughly in the form of a bell.

25. The starter according to claim 1, wherein the coupling piece is fixed to the pinion.

26. The starter according to claim 1, wherein the coupling piece is fixed to the starter head.

27. The starter according to claim 1, wherein the starter has at least one winding controlling an electric motor and adapted to be supplied electrically by an electronic control device for maneuvering the starter head.

28. The starter according to claim 1, wherein the tongues are bent axially proximal to anchoring ends thereof.

* * * * *